March 15, 1955 J. A. HAESELER 2,704,009
MONOCULAR
Filed May 1, 1950
2 Sheets-Sheet 1
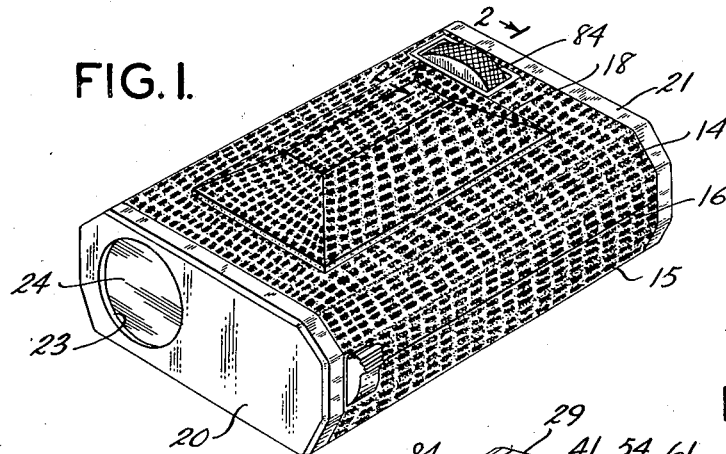
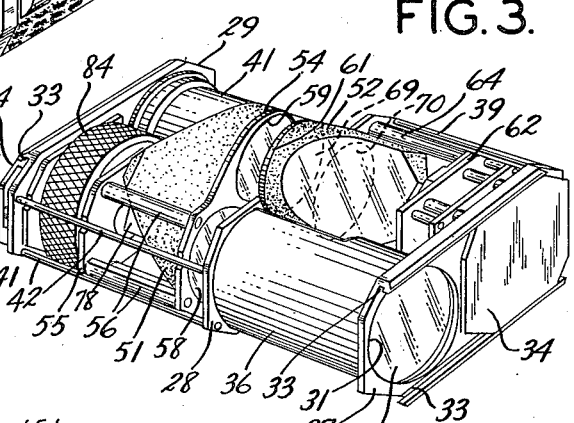
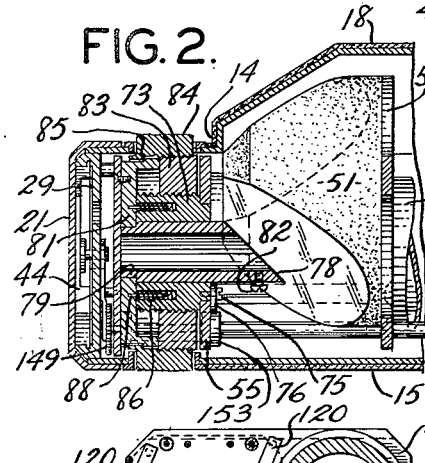
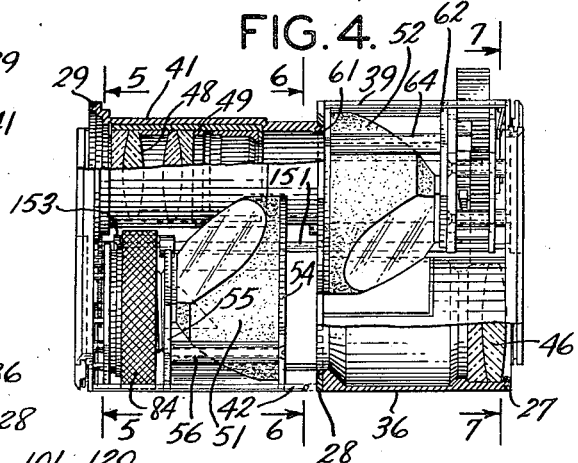
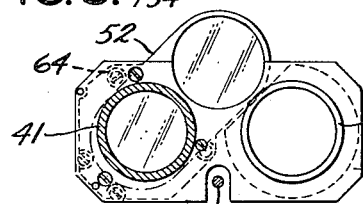
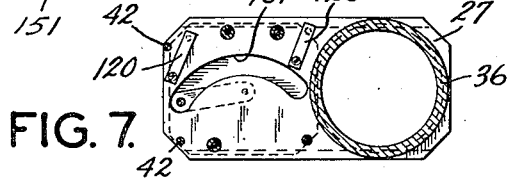
INVENTOR
John A. Haeseler
BY
ATTORNEY March 15, 1955  J. A. HAESELER  2,704,009
MONOCULAR
Filed May 1, 1950  2 Sheets-Sheet 2
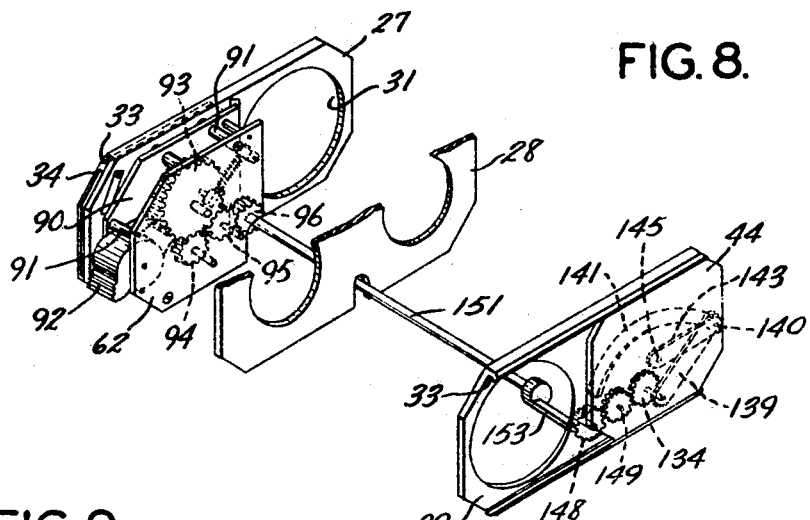
FIG. 8.
FIG. 9.
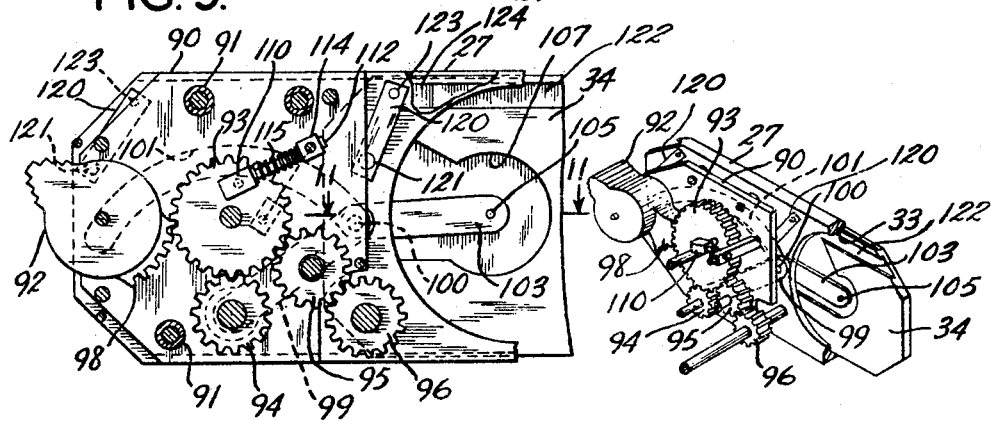
FIG. 10.
FIG. 11.
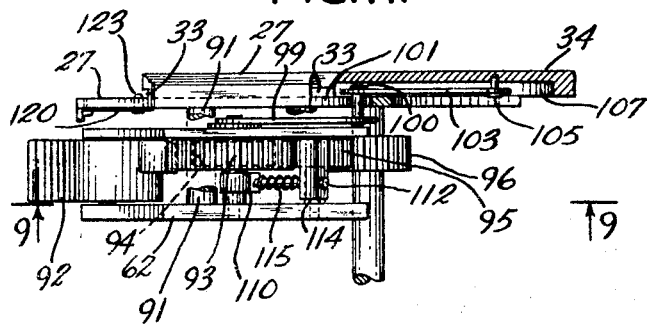
INVENTOR
John A. Haeseler
BY Emery, Varney,
Whittemore & Dry
ATTORNEY United States Patent Office 2,704,009
Patented Mar. 15, 1955

2,704,009

MONOCULAR

John A. Haeseler, Woodbridge, Conn.

Application May 1, 1950, Serial No. 159,252

4 Claims. (Cl. 88—33)

This invention relates to optical instruments that are used for magnifying distant objects.

In its broader aspects, it is an object of the invention to provide an improved optical instrument that is suitable for wider uses than comparable instruments of the prior art.

One of the outstanding disadvantages of binoculars, is the fact that they require special carrying cases and are often bulky and inconvenient to carry. Also binoculars cannot be readily passed from one person to another for viewing due to the adjustments necessary for inter-pupillary distance and the difference in focus between the two eyes of an individual. Another disadvantage is the high cost of binoculars. The monoculars that are available also require carrying cases if the lenses are to be protected.

Some of the novel features of this invention make the instrument compact and flat enough to fit readily into the pocket or handbag while still having lenses and prisms large enough to provide a wide and well illuminated field of vision. The preferred embodiment of the invention is a monocular so designed that the case is an integral part of the instrument and provides means for protecting both the objective and eye lens so that the instrument can be carried loose in the pocket or handbag without danger of scratching the lenses. Such protection is especially important if the lenses are coated.

One feature of the invention relates to an improved construction with prisms, or other reflecting surfaces, included in an optical system that is focused by adjusting the position of the reflectors with respect to the other reflectors and lenses. Only one-half as much movement is required to focus a system in which the reflectors are moved as compared with a system having movement of the lenses to adjust the focus. Also this arrangement makes it possible for the eye lens to remain near the eye of the user so that the full field is visible and at the same time the eye lens is within the instrument and protected by the means provided.

The maximum thickness of an optical system having prisms or other erecting reflectors is at the region of the reflectors, and this invention reduces the overall size of the apparatus by having a hump in the housing for accommodating the reflectors. Other features of the invention relate to a combination of a housing or case for the optical system with a focusing device that is exposed on both sides of the case so that the instrument can be readily focused. Also the instrument can be held steady while focusing by bracing it against the eyebrow or forehead, or in the case of an individual who wears glasses, often against the glasses.

Other objects, features and advantages of the invention will appear or be pointed out as the description proceeds.

In the drawing, forming a part hereof, in which like reference characters indicate corresponding parts in all the views, Figure 1 is a perspective view from the front of a monocular embodying this invention, Figure 2 is an enlarged sectional view taken on the plane 2—2 of Figure 1, Figure 3 is a perspective view of the monocular shown in Figure 1 with the ends and covers removed, Figure 4 is a top plan view, partly broken away and in section, of the structure shown in Figure 3, Figures 5, 6 and 7 are sectional views taken along the lines 5—5, 6—6 and 7—7, respectively, of Figure 4, Figure 8 is an exploded, fragmentary, perspective view, looking from the rear and illustrating the mechanism by which the lens covers are operated, Figure 9 is a greatly enlarged sectional view of a portion of the cover operating mechanism shown in Figure 8, the section being taken along the line 9—9 of Figure 11, Figure 10 is a reduced scale, perspective view of the mechanism shown in Figure 9, Figure 11 is a top plan view, partly in section, of the mechanism shown in Figure 9, the partial section being taken along the line 11—11 of Figure 9.

The monocular of this invention includes a housing which has an upper section 14 and a lower section 15 that meet along the line 16 substantially midway between the top and bottom walls of the housing. The upper section 14 has a raised portion or hump 18 extending above the level of the top wall of the housing for the purposes of providing space for erecting prisms or mirrors that are part of the optical system of the monocular. This raised portion 18 has sloping sides so that the monocular housing can be slipped into a pocket or other holder without having the raised portion 18 catch on the edge of the pocket or holder; and it is a feature of the construction that the monocular is relatively flat and shaped so that it can be conveniently held in the palm of one hand, or carried in a vest pocket.

The upper and lower sections 14 and 15 are held together by end shells 20 and 21 which provide forward and rearward walls for the housing. These end shells 20 and 21 have short sides that overlap the ends of the upper and lower sections 14 and 15 to hold these sections of the housing together. The front walls are preferably beveled at the region where they meet the sides of the shell. This is decorative and also makes the ends of the monocular look smaller. The end shells 20 and 21 are preferably cemented in place since there is no reason for opening the housing after the monocular has been originally assembled.

The forward shell 20 has an opening 23 near one side for admitting light to an objective lens. When the monocular is not in use, the objective lens is protected by cover 34 which is located behind the shell 20 and movable to cover or uncover the objective lens by a mechanism which will be described in connection with the other figures. There is a similar opening in the rearward shell 21 for passage of light from an eyepiece of the monocular, but this opening in the rearward shell is not shown in the drawing since it is the same as that in the forward shell 20, though on the opposite side of the monocular.

Figure 3 shows the monocular with the end shells and both the upper and lower sections of the housing removed. A composite, fixed frame of the monocular includes three transversely extending partitions 27, 28 and 29. The forward partition 27 has an opening 31 which is located behind the opening in the forward shell when the structure is assembled in the housing. The forward partition has projecting upper and lower edge portions and has channels 33 along these upper and lower edge portions. These channels serve as guideways or tracks for a slide or cover 34. With the cover 34 in the position shown in Fig. 3, the opening 31 is exposed across its full width; but the cover 34 slides in the channels 33 into another position in which it extends across the entire opening 31.

A tube 36 has a reduced diameter end portion that fits into the opening 31 and this tube is secured to the forward partition 27 around the periphery of this opening 31. The tube 36 extends rearwardly and has a reduced diameter, rearward end portion secured in an opening in the middle partition 28 so that the tube 36 comprises a rigid part of the fixed frame of the monocular, and this tube 36 holds the partitions 27 and 28 together in a definite spaced relation with one another. On the other side of the monocular, the middle partition 28 is connected with the forward partition 27, and held in parallel spaced relation to the front partition by columns 39.

The middle partition 28 is rigidly connected to the rearward partition 29, and held in spaced, parallel relation with this rearward partition 29 by a tube 41 at one side of the monocular, and columns 42 on the other side of the monocular. The tube 41 extends into openings in the middle partition 28 and in the rearward partition 29, similar to the openings into which tube 36 extends and with similar reduced diameter end portions that provide shoulders for abutting against the partitions, but the tube 41 is on the other side of the monocular from the tube 36 and in front of the eyepiece opening of the monocular.

The rearward partition 29 has projecting upper and lower edge portions with guideways or channels, similar to the forward partition 27 and indicated by the same reference character 33. There is a cover 44 that slides in the channels 33 of the rearward partition 29. This cover 44 corresponds with the cover 34 at the forward end of the monocular. Both of the tubes 36 and 41 are bonded or otherwise fastened to the partitions with which they connect.

There is an objective lens 46 in the forward end of the tube 36, and there is an eye lens 48 and a field lens 49 (Fig. 4) in the tube 41. The lenses 48 and 49 are actually carried by an inner tube 50 which fits securely in the tube 41. The rearward tube 41 contains a shoulder against which the inner tube 50 abuts to position the lenses 48 and 49. There is a spacer sleeve in the tube 50 for holding the lenses in position within the tube 50, and the rearward lens 48 is held in the tube 50 by a shoulder in the rearward end of the tube.

Beyond the rearward end of the objective tube 36, there is a prism 51, and at the forward end of the eyepiece tube 41 there is a prism 52. These erecting prisms extend upward and slope toward the center of the monocular so that the upper ends of the prisms confront one another and provide for the passage of a light beam from the prism 51 to the prism 52.

The prism 51 is clamped between a front plate 54 and a back plate 55 by tie rods 56. There is an opening 58 in the front plate 54 in alinement with the tube 36, and another opening 59 through the upper portion of the front plate 54 in position to permit passage of the light beam that is reflected from the prism 51 to the prism 52. The front and back plates 54 and 55 with their connecting tie rods 56 constitute a movable frame for shifting the prism 51 toward and away from the objective lens to focus the monocular.

The prism 52 is clamped in a fixed position in the monocular between a back plate 61 and front plate 62. These plates are connected by tie rods 64. Referring to Fig. 3, the back plate 61 has an opening 69 in alinement with the opening 59 of the plate 54 that holds the rearward prism 51; and the plate 61 has another opening 70 in alinement with the eyepiece tube 41.

The light passes through the objective lens 46 and along the tube 36, and reaches the prism 51 through the opening 58. Within the prism 51, the light beam is reflected from the lower face of the prism to the upper face of the prism, and then forward through the front face of the prism and through the openings 59 and 69 into the forward prism 52. In the prism 52 the light beam is reflected from the upper face to the lower face and then rearwardly; the rearward reflection being in a direction to pass through the opening in alinement with the axis of the eyepiece assembly in the tube 41.

Because of the feature by which the prism 51 is moved to focus the monocular, instead of moving the eyepiece lens, the amount of movement necessary for focusing is cut in half. This makes the monocular more compact by reducing not only the space required for movement of the adjustable element of the optical system, but also by reducing the space required for the adjusting mechanism by which the element of the optical system is moved.

Another advantage of adjusting the focusing of the optical system by moving one of the erecting prisms or reflectors is that the construction permits the eye lens 48 to remain always in the same fixed position with respect to the opening through the rearward wall of the housing. This leaves the eye lens in a position where it is protected, but the position is one in which the eye lens is close enough to the eye of an observer to permit the observer to see the full field that is covered by the optical system. If the eye lens moved away from the observer and further into the housing when focusing, the field seen by the observer would become progressively smaller.

The mechanism for shifting the prism 51 toward and from the objective lens is shown in Fig. 2. The back plate 55 fits over a reduced end of a threaded sleeve 73, and the back plate is secured to this sleeve by a screw 75 that clamps a retaining washer 76 against the front of the plate 55 so that the plate cannot move with respect to the threaded sleeve 73.

The sleeve 73 has a square opening that fits snugly around a ground or otherwise accurately machined bearing surface on the outside of a square tube 78. This tube has a reduced end portion 79 which extends into a bracket 81 fastened to the rearward partition 29, but spaced somewhat from the rearward partition in order to provide clearance for the mechanism that moves the rearward cover.

The reduced end 79 is preferably round, but it fits tightly in the bracket 81 so that the tube 78 cannot turn. The shoulder provided by reducing the end of the sleeve 78 abuts against the inside face of the bracket 81. In the preferred construction, the square tube 78 is made of lapped or ground steel and the sleeve 73 is made of brass so as to provide bearing surfaces that move over one another with reduced friction and with a minimum of wear. This keeps the adjusting mechanism free of play and maintains the erecting prism 51 in a straight line with respect to the longitudinal extent of the light beam through the housing. This bearing and adjusting mechanism also maintains the prism 51 at the intended angular relation with respect to the other erecting prism 52 (Fig. 3). A screw 82 at the end of the tube 78 prevents the sleeve 73 from being moved forward far enough to come off the end of the tube.

The axis of the tube 78 is substantially coincident with the optical axis of the objective lens but this is not necessary, it being sufficient to have the axis of the tube 78, and the resulting direction of travel of the back plate 55 and the prism 51, parallel to the optical axis of the objective lens.

The sleeve 73 has threads on its outside surface which screw into corresponding threads in a nut 83, and this nut 83 is screwed into a knob 84 which is accessible for manual operation through slots in both the top and bottom walls of the housing. The peripheral surface of the knob 84 is preferably knurled so that it can be turned more easily by the fingers of a person using the monocular.

The nut 83 and knob 84 are pinned together so that they turn as a unit. In order to prevent the knob 84 from moving longitudinally along its axis, the rearward face of the nut 83 is placed against an annular bearing surface on a forwardly extending portion of the periphery of the bracket 81; and an inwardly extending flange of the knob 84 is located behind a low shoulder 85 on this same forward extension of the bracket 81. After the knob 84 has been pinned to the nut 83, so that no further relative movement of these parts takes place, the knob 84 is held against longitudinal movement by the shoulder 85 and the annular bearing surface on the front of the bracket 81.

With this construction, it is evident that rotation of the knob 84 in one direction will advance the prism 51 toward the objective lens, while rotation of the knob 84 in the other direction moves the prism 51 rearwardly and away from the objective lens. The knob 84 extends through a slot in the top wall and is exposed through a slot in the bottom wall of the housing so that it can be turned by placing the index finger on top of the knob and the thumb against the bottom of the knob. This permits the user to turn the knob easily with a couple force which does not thrust the housing toward either side, and this makes it possible to hold the monocular much steadier while focusing than would be the case if the focusing knob extended through the top wall only or the bottom wall only. In the preferred construction, the knob 84 does not project beyond the plane of the outer end of the slot in the bottom wall. This prevents the knob from scratching a surface on which the bottom of the monocular rests.

Focusing of the monocular is more convenient if the focusing mechanism is free of back lash. In the construction illustrated, back lash is prevented by means of coil springs 86 located in recesses in the rearward end face of the sleeve 73. These springs 86 thrust against the bracket 81 and hold the threads of the sleeve 73 in contact with the forward faces of the screw threads in the nut 83. Any play or back lash in the threads is thus taken up in a forward direction, and the springs 86 are strong enough to always keep the play taken up in this direction no matter which way the knob 84 is being turned. In the preferred construction the springs 86 are on studs 88 extending from the bracket 81, and the purpose of these studs is to serve as guides for the springs.

Figures 8 to 11 show the mechanism for moving the covers 34 and 44 back and forth. Between the front plate 62 and the forward partition 27, there is another plate 90 connected with the plate 62 by columns 91. A lever 92, a large spur gear 93 and three smaller spur gears 94, 95 and 96 are supported on axles journalled at their opposite ends in the plate 62 and the plate 90.

There is a gear segment 98 at the inner end of the lever 92, and the teeth of this gear segment 98 mesh with the teeth of the large spur gear 93. The outer end of the lever 92 extends through a slot in the side of the housing of the monocular so that the lever 92 can be shifted up or down to move the lens covers into positions to either cover or expose the lenses.

The smaller spur gears 94 and 95 mesh with the larger spur gear 93. The axle of the gear 94 extends through the plate 90, and has a crank arm 99 connected to it at a location between the plate 90 and the forward partition 27, best shown in Figure 11. This crank arm 99 has a crank pin 100 extending from its outer end through a slot 101 in the forward partition 27. One end of a link 103 is connected with the front cover 34 by a pivot 105, and the other end of the link 103 is connected to the crank pin 100.

The pivot 105, link 103, and the outer end of the crank pin 100 are located in a recess 107 in the inner face of the cover 34. Angular movement of the crank 99 moves the link 103 back and forth to shift the cover 34 between open and closed positions.

Provision is made for holding the cover in either open or closed position by the pressure of a spring. In the construction illustrated, there is a block 110 pivotally connected with the inner face of the large spur gear 93. A stud 112 is secured at one end of the block 110, and the other end of the stud 112 fits slidably in an opening in a block 114 which has trunnions at its opposite ends extending into the same plates that support the axles of the gears. A spring 115 is compressed between the blocks 110 and 114.

When the lever 92 and spur gear 93 are in the positions shown in Figure 9, the pressure of the spring 115 urges the gear 93 to rotate in a counterclockwise direction. This holds the handle 92 at the end of its stroke toward which it moves during counterclockwise rotation of the gear 93, and the cover 34 is held in its closed position.

When the outer end of the lever 92 is pushed downward in Figure 9, the large spur gear 93 is rotated in a clockwise direction far enough to carry the block 110 into the dotted line position shown in the drawing. When the block is in this position, the spring 115 urges the gear 93 to turn in a clockwise direction and the spring pressure holds the lever 92 at the downward end of its stroke. The spring 115, therefore, serves to hold the cover 34 selectively in open position or in closed position.

The cover 34 slides freely in the channels 33 provided in the forward partition 27, but it is desirable to prevent the cover 34 from rattling. There are leaf springs 120 connected at their lower ends to the inner face of the partition 27 by screws 121. At the free end of each of these leaf springs 120, there is a button 123 extending through a hole in the partition 27 and into the path of the cover 34. There is a channel 122 (Fig. 10) in the inner face of the cover. This channel extends all the way to the right-hand end of the cover 34 but it terminates at an inclined surface 124 (Fig. 9) some distance from the other end of the cover.

When the cover 34 is at the left-hand end of its stroke, the inside face of the cover, between the inclined surface 124 and the left-hand end of the cover, is in contact with the left-hand button 123 and the spring 120 is flexed so that it exerts pressure against the cover 34 to prevent the cover from rattling when the monocular is moved. As the cover 34 moves to the right, the left-hand end of the cover passes beyond the left-hand button 123, but the right-hand button 123 does not exert any pressure against the cover 34 because the depth of the channel 122 is greater than the protrusion of this right-hand button. The advantage of this construction, with no pressure against a cover by the buttons 123, except near the ends of its stroke, the cover 34 moves freely and with a minimum of friction while shifting back and forth between its open and closed positions.

As the cover 34 approaches the right-hand end of its stroke, the inclined surface 124 comes into contact with the right-hand button 123 and presses this button back with a cam action and flexes the spring 120 to which the button is connected. At the right hand end of the stroke of the cover 34, the inclined surface 124 is slightly beyond the right-hand button 123, the button is in contact with the surface of the cover 34, and the spring 121 is flexed so that the cover is again pressed against the sides of the channels 33 and held against rattling.

The rearward cover 44 (Fig. 8) is moved back and forth in its guideways 33 by the same lever 92 that operates the front cover 34. The crank and link mechanism for operating the cover 44 is substantially the same as that used for operating the cover 34. A gear 134 has a crank 139 connected to its axle. A crank pin 140, at the outer end of the crank 139 extends through a slot 141 in the partition 29. This crank pin 140 is connected with one end of a link 143, and the other end of the link 143 is connected with the cover 44 by a pivot 145. There is a recess in the inner face of the cover 44, similar to that in the inner face of the cover 34, for providing clearance for the pivot 145, link 143, and crank pin 140.

The gear 134 is driven from another gear 148 through an idler gear 149. Power is supplied to the gear 148 through a shaft 151 which comprises an extension of the axle of the small spur gear 96 at the other end of the monocular. This gear 96 is driven from the large spur gear 93 through the gear 95 which serves as an idler. The shaft 151 has an offset portion 153 that provides clearance for the adjusting knob 84, as shown in Figure 4. Since the shaft 151 has angular movement through substantially less than a complete revolution, the offset portion 153 provides a convenient construction for obtaining space for a larger diameter of the knob 84.

The preferred construction of the invention has been illustrated and described, but changes and modifications can be made without departing from the invention as defined in the claims.

I claim as my invention:

1. A monocular comprising a housing with end walls and with objective and eye piece lens openings through the walls at opposite ends of the housing and near different sides of the housing, erecting reflectors within the housing and one of which is in line with the objective lens opening and the other in line with the eye piece lens opening, said reflectors having their upper portions sloping inwardly and confronting one another, a focusing knob located in the housing and having a portion of its periphery extending through an opening in the housing, threads within the focusing knob, a frame within the housing and by which one of the erecting reflectors is carried, bearing means on which the frame is movable to shift its reflector toward and from the other reflector, said frame having a portion that extends into the knob with threads that fit the threads within the knob so that relative rotation of the knob and the reflector frame produces longitudinal movement of the frame and knob with respect to one another, means supported from the housing for preventing rotation of the frame, and thrust bearings supported from the housing in position to prevent longitudinal movement of the knob with respect to the housing.

2. A monocular as described in claim 1, in which the diameter of the knob is somewhat greater than the height of the housing at the region of the knob, and the knob extends through openings in both the top and bottom walls of the housing so that it can be rotated by the fingers with a couple force that does not tend to displace the housing when held in front of the user's eye.

3. A monocular comprising a housing having forward and rearward end walls, an objective lens opening through the forward wall at one side of the housing, an eye piece opening through the rearward wall at the other side of the housing, erecting reflectors having their lower ends in line with the objective and eye piece opening respectively, and their upper ends confronting one another, a movable frame by which one of the erecting reflectors is carried, a knob carried by the housing and having a peripheral portion exposed through an opening in the housing, threads within the knob, a rearward end portion of the movable frame extending into the knob and having threads that engage the threads within the knob, a non-circular support extending longitudinally through the knob in the direction in which the reflector moves toward and from the other reflector, a bearing on the reflector frame movable along the non-circular support, and thrust bearings carried by the housing in position to prevent longitudinal movement of the knob.

4. A monocular comprising an eye piece and an objective with their optical axes substantially parallel with one another, a pair of erecting reflectors, one of which has its lower portion in line with the eye piece and the other of which has its lower portion in line with the objective, and both of which slope upwardly and inwardly and have their upper portions confronting one another, a fixed frame located within a housing and holding the first reflector and extending downward and sideways adjacent to the lower portion of its reflector and with a height not substantially greater than the diameter of the objective, a movable frame supporting the other reflector and extending sideways adjacent to the lower portion of its reflector and then longitudinally in a direction parallel to the optical axes and at a level extending above the lower end of the reflector by a height not substantially greater than the diameter of the objective, end walls of the housing with openings for the eye piece and the objective, said end walls being of equal height and not substantially higher than the diameter of the objective, a substantially flat bottom wall joining the lower edges of the end walls, a top wall covering the upper ends of the erecting reflectors and sloping downwardly on both sides of the reflectors, at substantially the same angle as the slope of the reflectors, said top wall having a lower flat portion connecting the upper edges of the end walls, the flat portion merging with the sloping parts of the top wall at lines spaced inwardly for substantial distances from sides of the housing, the longitudinally extending portion of the movable frame being enclosed between the bottom wall and the flat portion of the top wall, an adjusting knob of a diameter larger than the height of the housing and with a portion of its periphery exposed through an opening in the housing, and motion transmitting connections between the knob and the movable frame.

References Cited in the file of this patent

UNITED STATES PATENTS

| 1,427,592 | Hales | Aug. 29, 1922 |
| 1,710,109 | Paulus et al. | Apr. 23, 1929 |
| 1,796,456 | Halldorson | Mar. 17, 1931 |
| 2,171,360 | Strang | Aug. 29, 1939 |
| 2,277,065 | Bock | Mar. 24, 1942 |
| 2,291,821 | McNabb | Aug. 4, 1942 |
| 2,481,409 | Glauser | Sept. 6, 1949 |
| 2,488,188 | Halvorson | Nov. 15, 1949 |
| 2,514,257 | Reavis | July 4, 1950 |
| 2,534,061 | Rogers | Dec. 12, 1950 |
| 2,564,704 | Martling | Aug. 21, 1951 |

FOREIGN PATENTS

| 581,779 | Great Britain | Oct. 24, 1946 |